US012743052B2

(12) United States Patent
Hernandez

(10) Patent No.: US 12,743,052 B2
(45) Date of Patent: Sep. 22, 2026

(54) ELASTIC HOLDING MEMBER FOR ATTACHING A HOROLOGICAL COMPONENT TO A SUPPORT ELEMENT

(71) Applicant: Nivarox-FAR S.A., Le Locle (CH)

(72) Inventor: Ivan Hernandez, Cressier (CH)

(73) Assignee: Nivarox-FAR S.A., Le Locle (CH)

( * ) Notice: Subject to any disclaimer, the term of this patent is extended or adjusted under 35 U.S.C. 154(b) by 322 days.

(21) Appl. No.: 18/500,250

(22) Filed: Nov. 2, 2023

(65) Prior Publication Data

US 2024/0176299 A1 May 30, 2024

(30) Foreign Application Priority Data

Nov. 25, 2022 (EP) .................................... 22209691

(51) Int. Cl.
*G04B 17/34* (2006.01)

(52) U.S. Cl.
CPC .................................. *G04B 17/345* (2013.01)

(58) Field of Classification Search
None
See application file for complete search history.

(56) References Cited

U.S. PATENT DOCUMENTS

| | | | |
|---|---|---|---|
| 3,121,307 A | 2/1964 | Greiner | |
| 3,846,612 A | 11/1974 | Augsburger | |
| 2017/0261937 A1 | 9/2017 | Merino | |

FOREIGN PATENT DOCUMENTS

| | | | | |
|---|---|---|---|---|
| CH | 715 664 A2 | 6/2020 | | |
| CH | 716511 A2 * | 2/2021 | | F16D 1/0805 |
| CN | 102566401 A | 7/2012 | | |
| CN | 104024962 A | 9/2014 | | |
| CN | 104133362 A | 11/2014 | | |
| CN | 107450296 A | 12/2017 | | |
| CN | 107957674 A | 4/2018 | | |
| EP | 1826635 A1 * | 8/2007 | | G04B 17/325 |
| EP | 3 401 740 A1 | 11/2018 | | |
| JP | 2009-265097 A | 11/2009 | | |
| JP | 6345822 B2 | 6/2018 | | |
| JP | 2021-32878 A | 3/2021 | | |
| JP | 2022-511884 A | 2/2022 | | |
| TW | 200819931 A | 5/2008 | | |

OTHER PUBLICATIONS

Espacenet combined translation of EP 1826635 (Year: 2025).*
Espacenet combined machine translation of CH 716511. (Year: 2025).*

(Continued)

*Primary Examiner* — Regis J Betsch
*Assistant Examiner* — Michael James Walker
(74) *Attorney, Agent, or Firm* — Oblon, McClelland, Maier & Neustadt, L.L.P.

(57) ABSTRACT

An elastic holding member including a body provided with rigid portions and deformable portions each provided with a through hole, the member being intended for attaching a horological component to a support element and including an opening the contour of which includes three contact zones intended to come into abutment on the support element, the contact zones each being included on an internal face of a reception region of each deformable portion.

16 Claims, 1 Drawing Sheet

(56) References Cited

OTHER PUBLICATIONS

Figure 1:
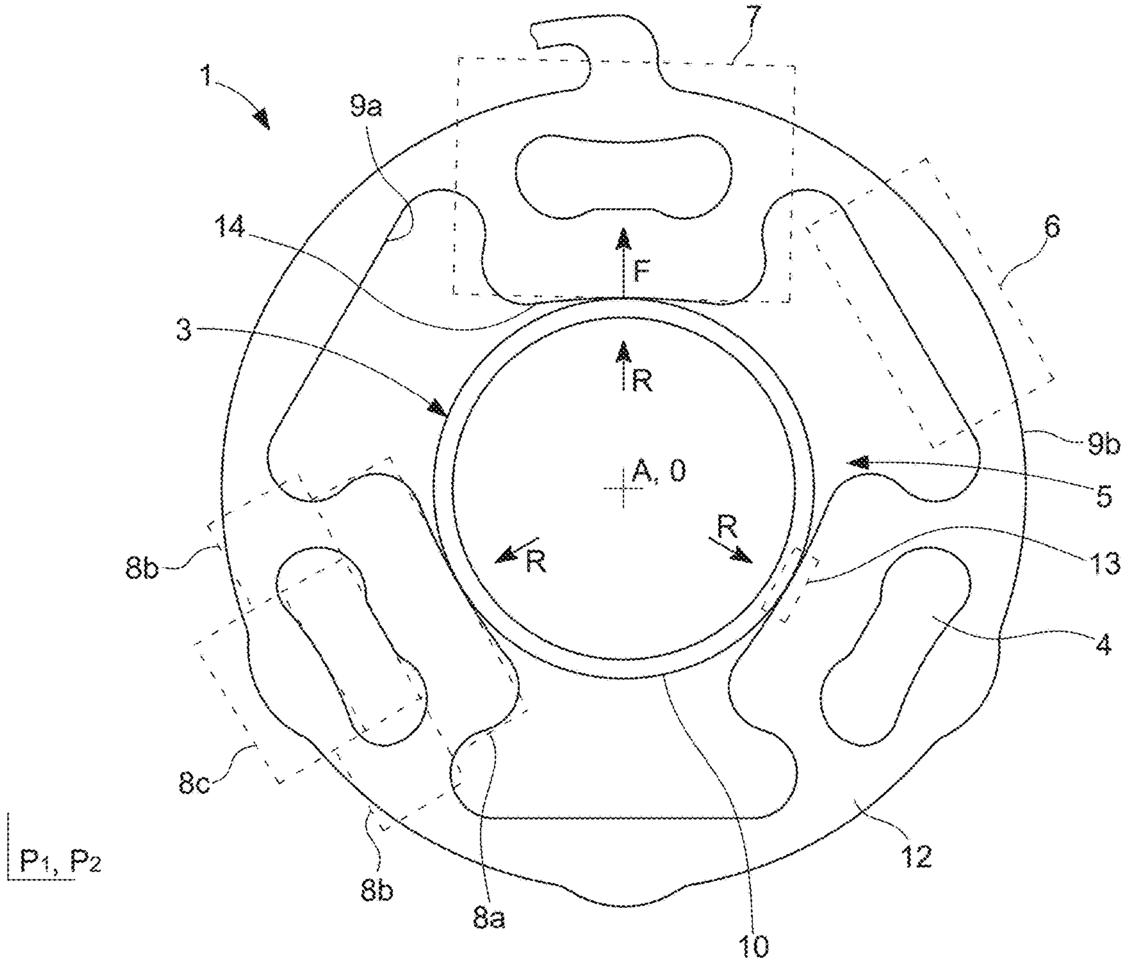

Combined Taiwanese Office Action and Search Report issued Sep. 3, 2024, in corresponding Taiwanese Patent Application No. 112140140 (with English Translation), 22 pages.
European Search Report issued Apr. 14, 2023 in European Application 22209691.9 filed on Nov. 25, 2022, 3 pages (with English Translation of Categories of Cited Documents).
Office Action issued Oct. 22, 2024, in corresponding Japanese Patent Application No. 2023-184043, 7 pages.
Indian Office Action issued Dec. 24, 2025 in Indian Patent Application No. 202344078589, 17 pages.

* cited by examiner

ELASTIC HOLDING MEMBER FOR ATTACHING A HOROLOGICAL COMPONENT TO A SUPPORT ELEMENT

CROSS-REFERENCE TO RELATED APPLICATION

This application claims priority to European Patent Application No. 22209691.9 filed on Nov. 25, 2022, the entire disclosure of which is hereby incorporated herein by reference.

FIELD OF THE INVENTION

The invention relates to an elastic holding member such as for example a collet for attaching a horological component. This member is configured to participate in the attaching of the horological component to a support element.

BACKGROUND OF THE INVENTION

In the prior art, elastic holding members such as horological collets are known, which participate in assembling balance springs on balance shafts in a horological movement, by elastic clamping.

However, such elastic holding members have the major drawback of requiring, in the context of the production of such assemblies, assembly operations that are complex, lengthy and expensive because these members have holding torques on these balance shafts that are weak and limited.

SUMMARY OF THE INVENTION

The aim of the present invention is to overcome all or some of the previously mentioned drawbacks by proposing an elastic holding member that has high holding torque in particular for facilitating/simplifying the operations of mounting an assembly of a set consisting of elastic holding member and horological component with a support element as well as ensuring sufficient strength to guarantee holding in position in the plane and to guarantee its angular position throughout the life of the component.

For this purpose, the invention relates to an elastic holding member comprising a body provided with rigid portions and deformable portions each provided with a through hole, said member being intended for attaching a horological component to a support element and comprising an opening the contour of which comprises three contact zones intended to come into abutment on said support element, said contact zones each being included on an internal face of a reception region of each deformable portion.

In other embodiments:

- the body of said member is rigid, with the exception of the deformable portions that it includes;
- each deformable portion extends between internal and external peripheral walls of the body of the member;
- the deformable portions are identical;
- each deformable portion is arranged in the body of said member at equal distances from each of the other deformable portions that are arranged in the direct vicinity thereof in said body;
- each deformable portion is configured to vary a volume defined in its through hole when this portion is stressed by the support element;
- each deformable portion consists of different regions that are configured to be deformed in different ways as soon as they are stressed by the support element;
- the through hole of each deformable portion represents between 20 and 80 percent of the part of the body of the member constituting said portion;
- the elastic holding member comprises a point of attachment with the horological component;
- the elastic holding member is a collet for attaching the horological component, such as a balance spring, to a support element such as a balance shaft;
- the elastic holding member is produced from a material made from silicon or based on silicon.

The invention also relates to a set consisting of elastic holding member and horological component for a horological movement of a timepiece comprising said holding member.

Advantageously, the set is in a single piece.

The invention also relates to an assembly for a horological movement of a timepiece comprising said set consisting of elastic holding member and horological component, said set being attached to a support element.

The invention also relates to a horological movement comprising said at least one assembly.

The invention also relates to a timepiece comprising such a horological movement.

The invention also relates to a method for producing such an assembly of a set consisting of elastic holding member and horological component with a support element, comprising:

- a step of inserting the support element in the opening of the elastic holding member of said set, said step comprising a substep of elastic deformation of the elastic holding member provided with a phase of deformation of the deformable portions of the elastic holding member causing a radial movement of each deformable portion with respect to an axis of revolution of the elastic holding member, and
- a step of attaching the holding member to the support element comprising a substep of implementing a radial elastic clamping of the holding member on the support element.

SUMMARY DESCRIPTION OF THE DRAWINGS

Figure 2:
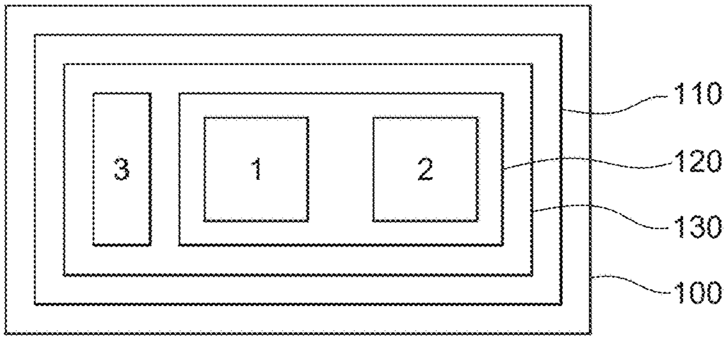
Figure 3:

Other particularities and advantages of the invention will become apparent from the description given below, by way of indication and in no way limitatively, with reference to the appended drawings wherein:

FIG. 1 is a view of an elastic holding member for attaching a horological component to a support element according to one embodiment of the invention;

FIG. 2 shows a timepiece comprising a horological movement provided with at least one assembly including a set consisting of elastic holding member and horological component attached to a support element according to one embodiment of the invention; and FIG. 3 shows a method for producing such an assembly of a set consisting of elastic holding member and horological component with a support element.

DETAILED DESCRIPTION OF PREFERRED EMBODIMENTS

FIG. 1 presents an embodiment of the elastic holding member 1 for attaching a horological component 2 to a support element 3. By way of example the elastic holding member 1 may be a collet for attaching the horological component 2, such as a balance spring, to a support element 3 such as a balance shaft.

In this embodiment, this holding member 1 can be included in a set 120 consisting of elastic holding member and horological component visible on FIG. 2 and which is designed to be arranged in a horological movement 110 of a timepiece 100. Such an assembly 120 may be a single piece produced from a so-called "fragile" material, preferably a micromachinable material. Such a material may comprise silicon, quartz, corundum or ceramic.

In the context of the invention, this holding member 1 has a thickness of between 50 and 150 μm. Such a thickness is preferably of the order of 100 μm.

It should be noted that, in a variant of this set 120, only the elastic holding member 1 can be produced from such a so-called "fragile" material, the horological component 2 then being manufactured from another material.

This set 120 can form part of an assembly 130 for the horological movement 110, while being attached to the support element 3 for example by elastic clamping. It should be noted that this assembly 130 has been imagined for applications in the horological field. However, the invention can perfectly be used in other fields, such as aeronautics, jewellery or automobile.

Such a holding member 1 comprises an opening 5, also referred to as "central opening", in which the support element 3 is intended to be inserted. This opening 5 defines a volume in the holding member 1 that is smaller than that of a connecting part of an end of the support element 3 that is designed to be arranged therein. It should be noted that this connecting part has a circular cross-section and comprises, in whole or in part, contact portions defined on a peripheral wall of the support element 3.

Such a member 1 also comprises a top face and a bottom face 12, preferably both planar, included respectively in first and second planes P1 and P2 visible on FIG. 1, which are parallel to each other.

This member 1 also comprises internal and external peripheral walls 9*a*, 9*b* that connect the top and bottom faces 12 to each other. The external peripheral wall 9*b* comprises a surface that externally delimits the contour of the holding member 1. This peripheral wall 9*b* confers on this member 1 an essentially hexagonal form. With regard to the internal peripheral wall 9*a*, this comprises a surface that delimits the contour of an opening 5 in this holding member 1. As we shall see hereinafter, this internal peripheral wall 9*a* comprises contact zones 13 intended to come into abutment on the support element 3. It should be noted that the transverse dimension of the external peripheral wall 9*b* or of the internal peripheral wall 9*a* that is parallel to an axis of revolution A of the holding member 1 corresponds here to the thickness of this member 1.

This holding member 1 comprises a body provided with three deformable portions 7, also referred to as "flexible portions" or "elastic portions". Each deformable portion 7 is configured to regain its original shape after having been deformed. In other words, these portions are reversibly deformable portions 6. The body of this member 1 is rigid, or mainly rigid, with the exception of the deformable portions 7 that it includes. In other words, this body comprises deformable portions 7 and rigid portions 6. Rigid portions 6 must be understood to mean portions 6 that withstand pressure or deformation, i.e. non-deformable portions. In the holding member 1, the rigid portions 6 are configured to be acted on essentially under traction. In this configuration, these rigid portions 6 withstand pressure or deformation under traction.

It will therefore be understood that, in the body of this member 1, the deformable portions 7 are separated from each other by the rigid portions 6. It can also be said that these deformable portions 7 are connected together by these rigid portions 6. It will be noted that each deformable portion 7 is arranged in the body of said member 1 at equal distances from each of the other deformable portions 7 that are arranged in the direct vicinity thereof, or in the closest vicinity, in said body.

In this configuration, each deformable portion 7 extends between the internal and external peripheral walls 9*a*, 9*b* of the body of the member 1. It should be noted that such deformable portions 7 are similar to each other. In this member 1, these portions 7 form a protrusion in the internal peripheral wall 9*a* of the body of the member 1 that extends in the direction of the centre O of the holding member 1.

Each deformable portion 7 comprises a reception region 8*a*, two connecting regions 8*b* and one external region 8*c*. These regions 8*a*, 8*b*, 8*c* delimit together the periphery of a through hole 4 of this portion 7.

In this configuration, the reception region 8*a* lies between the internal peripheral wall 9*a* of the member 1 and a part of the periphery of the through hole 4 while being connected to the two connecting regions 8*b* of this deformable portion 7. This reception region 8*a* is provided with an internal face 14 comprising the contact zone 13 of each deformable portion 7. This internal face 14 is formed by a part of the internal peripheral wall 9*a* that is included in this portion 7. In other words, this internal face 14 is included at the end of the protrusion forming this deformable portion 7 opposite the centre O of the holding member 1. In this configuration, the contact zone 13 may have:

- a rounded or convex surface while being arranged between two hollow or concave parts of the internal face 14, or
- a planar or essentially planar surface.

This contact zone 13 comprises a substantially hollow or substantially concave part in which two bearing zones are included. These two bearing zones are able to cooperate with the corresponding convex contact portion of the support element 3. Such bearing zones are defined/included in the surface of this contact zone 13 while extending substantially over all or part of the thickness of the holding member 1. In addition, these bearing zones are flat, each comprising a surface that is in whole or in part planar. In the contact zone 13, the two bearing zones are included respectively in different planes forming together an obtuse angle. These two bearing zones are separate, being spaced apart from each other. In other words, the contact zone 13 comprises a zone connecting the two bearing zones. This connection zone preferably has a rounded shape.

These bearing zones are designed in particular to cooperate with the contact portions in a contact configuration of the planoconvex type or planocylindrical if account is taken of the cylindrical shape of the support element 3. In this configuration, the planar surface of each bearing zone cooperates with the corresponding convex-shaped contact portion of the support element 3. It should be stated here that this convex shape of each contact portion is assessed relatively to the planar surface of each corresponding bearing zone opposite which this portion is arranged. It should be noted that this planar surface of each bearing zone forms a plane tangent to the diameter of the support element 3. In other words, the planar surface is perpendicular to the diameter and therefore to the radius of the support element.

In this configuration, the presence of two flat bearing zones in each contact zone 13 of the holding member 1 makes it possible to implement a contact pressure between this holding member 1 and the support element 3 during the making of the mechanical connection between them, and this while appreciably reducing the intensity of the stresses at these bearing zones and the corresponding contact portions of the support element 3 during the assembly and/or the attaching of this holding member 1 with the support element 3, said stresses being liable to damage the holding member 1 through the appearance of fractures/breaks or cracks.

In this member 1, the presence of this contact zone 13 in the internal face 8 of each deformable portion 7 makes it possible to implement a contact pressure between this holding member 1 and the support element 3 during the making of the mechanical connection between them, and this while appreciably reducing the intensity of the stresses at this contact zone 13 and the corresponding contact region of the support element 3 during the assembly and/or an attaching of this holding element 1 with the support element 3, said stresses be liable to damage the holding member 1 through the appearance of fractures/breaks or cracks.

As we have seen, these deformable portions 7 therefore comprise the only contact zones 13 of the member 1 with the support element 3 that can be defined in all or part of the internal faces 8 of these portions 7. With reference to FIG. 1, these contact zones 13 are three in number and can participate in the implementation of a precise centring of the horological component 2, for example a balance spring, in the horological movement 110.

In each deformable portion 7, the external region 8*c* lies between the external peripheral wall 9*b* of the member 1 and a part of the periphery of the through hole 4 while being connected also to the two connecting regions 8*b*. With regard to these two connecting regions 8*b*, they each lie between an end of a rigid portion 6, a part of the external peripheral wall 9*b* and a part of the periphery of the through hole. It should be noted that these two connecting regions also connect the reception 8*a* and external 8*c* regions to each other.

In the member 1, the deformable portion 7 comprises the through hole 4, also referred to as a recess, and which is defined in the thickness of this member 1. This through hole 4 emerges in both the top and bottom faces 10 of the member 1. It can also be said that this through hole 4 emerges at one end in the top face of the deformable portion 7 and at another end in the bottom face 10 of this portion 7. This hole 4 extends in the direction of the axis of revolution A, from the top face towards the bottom face 10 or vice versa. In other words, this hole 4 connects these two faces 10 to each other. This through hole 4 defines a void volume or a volume empty of material or of absence of material. It will therefore be understood that this volume corresponds to a variable or configurable volume. This volume comprises an open chamber delimited by a peripheral wall of this hole 4. Such a through hole 4 represents between approximately 20 and 80 percent of the body of the deformable portion 7. Preferably, this through hole 4 represents 30 percent of this body.

Under these conditions, it will be noted that each deformable portion 7 is configured to modify the volume defined by this through hole 4 when this portion 7 is stressed by the support element 3.

In this member, the rigid portions 6 extend between the internal and external peripheral walls 9*a*, 9*b* of the body of the member 1. These rigid portions 6 preferably have an elongate shape. This is because each rigid portion extends longitudinally between two deformable portions 7 to which it is connected. It will therefore be understood that each rigid portion 6 is connected directly at each of its two opposite ends to two deformable portions 7. In addition, it will therefore be noted that the deformable 7 and rigid 6 portions are arranged successively and in alternation in the holding member 1. Each rigid portion 6 is connected to two different deformable portions 7, said deformable portions 7 being connected "directly" to the other rigid portions 6 of the member 1. It should be noted that the rigid portions 6 are here non-deformable or almost non-deformable and fulfil a role of stiffening elements of the holding member 1.

Moreover, in each deformable portion 7, the reception region 8*a*, the two connecting regions 8*b* and the external region 8*c* border/surround/delimit the through hole 4. More precisely, these regions 8*a* to 8*c* are configured to be deformed in different ways as soon as they are stressed by the insertion of the support element 3 in the opening 5 of the member 1. This is because, for each deformable portion 7, each of these regions 8*a* to 8*c* has a coefficient of deformation $C_{rr}$, $C_{rl}$, $C_{re}$ the value of which decreases as this region 8*a*, 8*b*, 8*c* is moved away from the contact zone 13 of the reception region 8*a*. In other words, the coefficient of deformation $C_{rr}$, also referred to as mean coefficient of deformation $C_{rr}$, of the reception region 8*a* has a higher or greater value than the value of the coefficient $C_{rl}$ of the two connecting regions 8*b* and that of the coefficient $C_{re}$ of the external region 8*c*. In addition, the coefficients $C_{rl}$ of the two connecting regions 8*b* have similar or substantially similar values, which are higher than those of the coefficient $C_{re}$ of the external region 8*c*. In other words, the relationship between these mean deformation coefficients $C_{rr}$, $C_{rl}$, et $C_{re}$ of these regions 8*a*, 8*b*, 8*c* can be defined in accordance with the following mathematical formula:

$$C_{rr} > C_{rl} > C_{re}$$

It should be noted that the deformations of these regions 8*a*, 8*b*, 8*c* cause a radial movement relatively to the axis of revolution A, of each of them. The magnitude/intensity of these radial movements are of course dependent on the mean deformation coefficients $C_{rr}$, $C_{rl}$, $C_{re}$ of these regions 8*a*, 8*b*, 8*c*.

In this holding member 1, these rigid and deformable portions 6, 7 make it possible essentially to implement an attachment of the elastic clamping type of the support element 3 in the opening 5 provided in this holding member 1, which is defined by the internal peripheral wall 9*a* of this holding member 1.

As we have seen, these deformable portions 7 comprise the only contact zones 13 of the holding member 1 with the support element 3 that can be defined in all or part of the internal faces 14 of these deformable portions 7. The contact zone 13 of each deformable portion 7 is designed to cooperate with a peripheral wall 10 of the connecting part of the support element 3, in particular with the corresponding contact region defined in this peripheral wall 10 of the support element 3. In this context, the holding member 1 then comprises three contact zones 13 that participate in the implementation of a precise centring of the horological component 2, for example a balance spring, in the horological movement 110. The holding member 1 further includes a point of attachment 11 with the horological component 2.

In this configuration, the elasticity or flexibility of the member 1 is defined relatively to the contact zones 13 of this member 1, or more precisely relatively to the intensity of the deformation of the deformable portions 7 when a force is applied to these contact zones 13.

Moreover, in this holding member 1, the rigid portions 6 and deformable portions 7 enable the holding member 1 to store a greater quantity of elastic energy for the same clamping compared with the holding members of the prior art. It should be noted that this large storage of energy is related in particular to the volume of material forming this holding member 1 provided with the through holes 4 and the rigid portions 6 acted on under traction. Such a quantity of elastic energy stored in the holding member 1 then makes it possible to obtain a greater holding torque of the holding member on the support element 3 in the assembly 130 of the set 120 consisting of holding member and horological component with this support element 3. In addition, it should be noted that such a configuration of the holding member 1 makes it possible to store elastic energy ratios that are 6 to 8 times greater than those of the holding members of the prior art.

It should be noted that the arrangement of the rigid and deformable portions 6, 7 in the holding member 1 allows, during an insertion with clamping, deformation of each deformable portion 7 making it possible to accommodate the deformation of the whole of the holding member 1 with the geometry of the connecting part of the support element 3 on which it is assembled.

In addition, it should be noted that the through hole 4 in the holding member 1 is configured in order to help to control the movement of the deformable portions 7, in particular to reduce this movement, so that the deformable portions 7 combined with the rigid portions 6 can store a maximum amount of elastic energy during the driving of the member 1 onto the support element 3 and thus to increase the holding of this member 1 on this element 3.

With reference to FIG. 3, the invention also relates to a method for producing the assembly 130 of the set 120 consisting of elastic holding member and horological component with the support element 3. This method comprises a step 20 of inserting the support element 3 in the opening 5 in the holding member 1. During this step 20, the end of the support element is presented at the entrance of the opening 5 defined in the bottom face 12 of the holding member 1 in preparation for the insertion of the connecting part of this support element 3 in the volume defined in this opening 5. This step 20 comprises a substep of elastic deformation 21 of the holding member 1, in particular of a central zone of this holding member 1 comprising said opening 5, resulting from the application of a contact force F on the contact zones 13 of the deformable portions 7 by the contact portions of the peripheral wall 10 of the connecting part of the support element 3. This elastic deformation of the central zone in fact causes a deformation of the various regions 8*a*, 8*b*, 8*c* of each deformable portion 7 comprising the contact zone 13.

This deformation substep 21 of the method comprises a phase 22 of moving the deformable portions 7 under the action of the contact force F that is applied thereto. Such a movement of these deformable portions 7 is implemented in a radial direction A with respect to the axis of revolution A common to the support element 3 and to the holding member 1. The contact force F is preferably perpendicular or substantially perpendicular to said contact zone 13. When this phase 23 takes place, the rigid forces 6 do not deform.

This method next comprises a step 23 of attaching the holding member 1 on the support element 3. Such a step 23 of attaching in particular by radial elastic clamping comprises a substep 24 of implementing a radial elastic clamping of the holding member 1 on the support element 3. It would therefore be understood that, in such a stressed state, the holding member 1 stores a large quantity of elastic energy that helps to confer on it a significant holding torque in particular allowing optimum pinning by elastic clamping.

The invention claimed is:

1. An elastic holding member comprising:

a body provided with rigid portions and deformable portions, each of the deformable portions being provided with a through hole, said holding member configured to attach a horological component to a support element; and an opening in the body the contour of which comprises three contact zones configured to come into abutment on said support element, said contact zones each being included on an internal face of a reception region of each deformable portion, wherein each of the deformable portions includes a plurality of regions that are configured to be deformed in different ways as soon as they are stressed by the support element, wherein a first region of the plurality of regions is positioned between the through hole of a respective deformable portion and an external peripheral wall of the body, and wherein a second region of the plurality of regions is positioned between the through hole and an adjacent rigid portion.

2. The elastic holding member according to claim 1, wherein the body of said member is rigid with the exception of the deformable portions that it includes.

3. The elastic holding member according to claim 1, wherein each deformable portion extends between internal and external peripheral walls of the body of the member.

4. The elastic holding member according to claim 1, wherein the deformable portions are identical.

5. The elastic holding member according to claim 1, wherein each deformable portion is arranged in the body of said member at equal distances from each of the other deformable portions that are arranged in the direct vicinity thereof in said body.

6. The elastic holding member according to claim 1, wherein each deformable portion is configured to vary a volume defined in its through hole when this portion is stressed by the support element.

7. The elastic holding member according to claim 1, wherein the through hole of each deformable portion represents between 20 and 80 percent of the part of the body of the member constituting said portion.

8. The elastic holding member according to claim 1, further comprising a point of attachment with the horological component.

9. The elastic holding member according to claim 1, wherein said elastic holding member is a collet for attaching the horological component to a support element.

10. The elastic holding member according to claim 1, comprising a material made from silicon or based on silicon.

11. A set comprising of an elastic holding member and an horological component for a horological movement of a timepiece comprising a holding member according to claim 1.

12. The set according to claim 11, wherein said set is in a single piece.

13. An assembly for a horological movement of a timepiece comprising a set comprising an elastic holding member and an horological component according to claim 11, said set being secured to a support element.

14. A horological movement comprising at least one assembly according to claim 13.

15. A timepiece comprising a horological movement according to claim 14.

16. A method for producing an assembly of a set comprising an elastic holding member and an horological component with a support element according to claim 15, said method comprising:

a step of inserting the support element in the opening of the elastic holding member of said set, said step comprising a substep of elastic deformation of the elastic holding member provided with a phase of deformation of the deformable portions of the elastic holding member causing a radial movement of each deformable portion with respect to an axis of revolution of the elastic holding member, and a step of attaching the holding member to the support element comprising a substep of implementing a radial elastic clamping of the holding member on the support element.

* * * * *